340-870.11 SR CROSS REFERENCE [redacted]

XR 3,117,303

230

2

Jan. 7, 1964 J. F. BYRNE 3,117,303

RANDOM ACCESS SWITCHING SYSTEM

Filed March 13, 1959 4 Sheets-Sheet 1

INVENTOR.
Joseph F. Byrne.
BY W. L. Stout
HIS ATTORNEY

INVENTOR.
Joseph F. Byrne.
BY W. L. Stout
HIS ATTORNEY

INVENTOR.
Joseph F. Byrne
BY W. L. Stout.
HIS ATTORNEY

RANDOM ACCESS SWITCHING SYSTEM

Filed March 13, 1959 4 Sheets-Sheet 4

INVENTOR.
Joseph F. Byrne
BY W. L. Stout.
HIS ATTORNEY

United States Patent Office 3,117,303

Patented Jan. 7, 1964

3,117,303

RANDOM ACCESS SWITCHING SYSTEM

Joseph F. Byrne, O'Hara Township, Allegheny County, Pa., assignor to Westinghouse Air Brake Company, Wilmerding, Pa., a corporation of Pennsylvania Filed Mar. 13, 1959, Ser. No. 799,247

12 Claims. (Cl. 340—147)

Figure 1A:
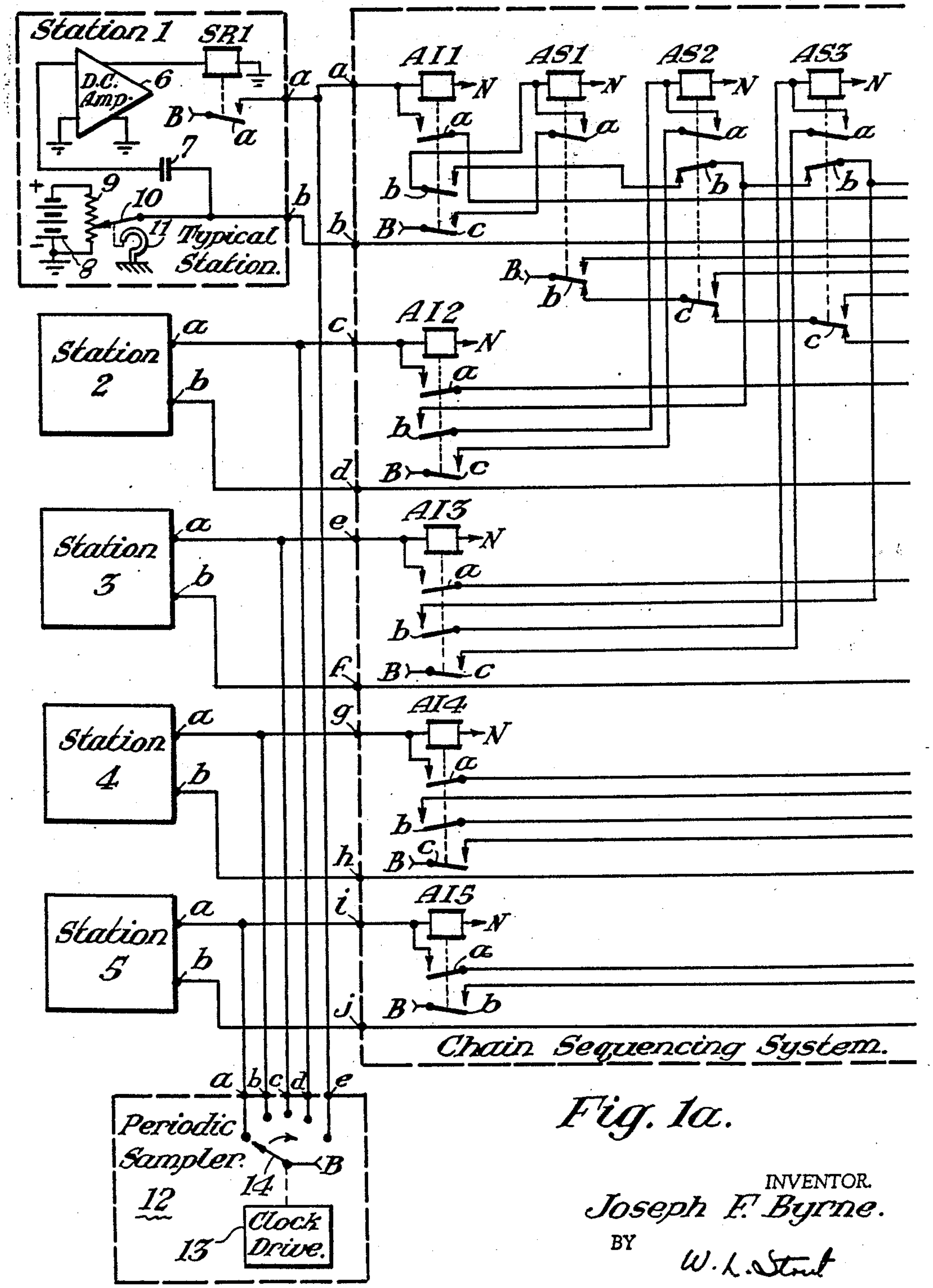

This invention relates to switching systems, and particularly to an improved switching system for connecting randomly available inputs to a common output.

In many computing and telemetering applications, it is desirable to use a common system such as a computer or indicator to process the output of any one of a number of available inputs, which inputs may require processing at periodic intervals, or randomly occurring intervals, or both. For example, in the centralized control of a plurality of pipeline pumping stations from an office location, it is desirable to compute flow at any given location in terms of measurements made at the location at periodic intervals, and, should any of the field locations exhibit a sudden change in the flow with a corresponding change in the flow measuring parameters, to compute the flow at that location immediately.

It is a primary object of my invention to provide a switching system for connecting randomly and/or periodically occurring inputs of the type described to a common system.

It is a further object of my invention to provide a switching system for connecting randomly occurring inputs to a common output while at the same time preventing multiple connections of two or more inputs to the output.

It is a further object of my invention to provide a system for connecting the first occurring of a plurality of randomly occurring inputs to a common output and storing subsequent inputs until preceding inputs have been processed.

It is a further object of my invention to provide a switching system for connecting, one at a time, randomly occurring inputs to a common output, in which means are provided for enforcing a predetermined sequence on the processing of substantially simultaneously occurring inputs.

It is a further object of my invention to provide a random access circuit for sequencing a plurality of random inputs to common equipment in such a manner that an input connection cannot be repeated until all waiting inputs have had access to the common equipment.

It is a further object of my invention to provide circuit means for connecting randomly occurring inputs to a common output in which a circuit connection is made by a cascade operation that prevents multiple connections.

Other objects and further advantages of my invention will become apparent to those skilled in the art as the description proceeds.

In practicing my invention, in accordance with one embodiment thereof, I provide a plurality of input relays, one for each of the randomly occurring inputs, and connected to be actuated for each input when processing of the input by connection to a common system is required. I further provide a series of sequencing relays, one for each input relay, and circuit means for controlling each relay from the input relays and from succeeding sequence relays so that a lower ordered sequence relay can be picked up only if higher ordered sequence relays are released. I further provide a group of connector relays, one for each sequence relay, connected for operation by the corresponding sequence relay to connect a corresponding input to common equipment. These relays are connected in a manner to be described in detail hereinafter so that a higher ordered connector relay can be picked up only if lower ordered sequence relays are released. Thus, only one input at a time can be connected to the common equipment. In this embodiment, a request for input processing initiated by the energization of an input relay is stored by a stick circuit for the input relay until preceding inputs have been processed. For simultaneously occurring inputs, the described embodiment enforces a preferred sequence on the connection of the inputs to the output.

In practicing my invention in accordance with a second embodiment thereof, I provide a plurality of input, sequence and connector relays of the type described above, but in this embodiment of my invention the sequence relays are provided with control circuits for enforcing a cascade operation of the sequence relays for each input so that simultaneous inputs are prevented from making simultaneous connections to the common equipment.

Figure 1B:
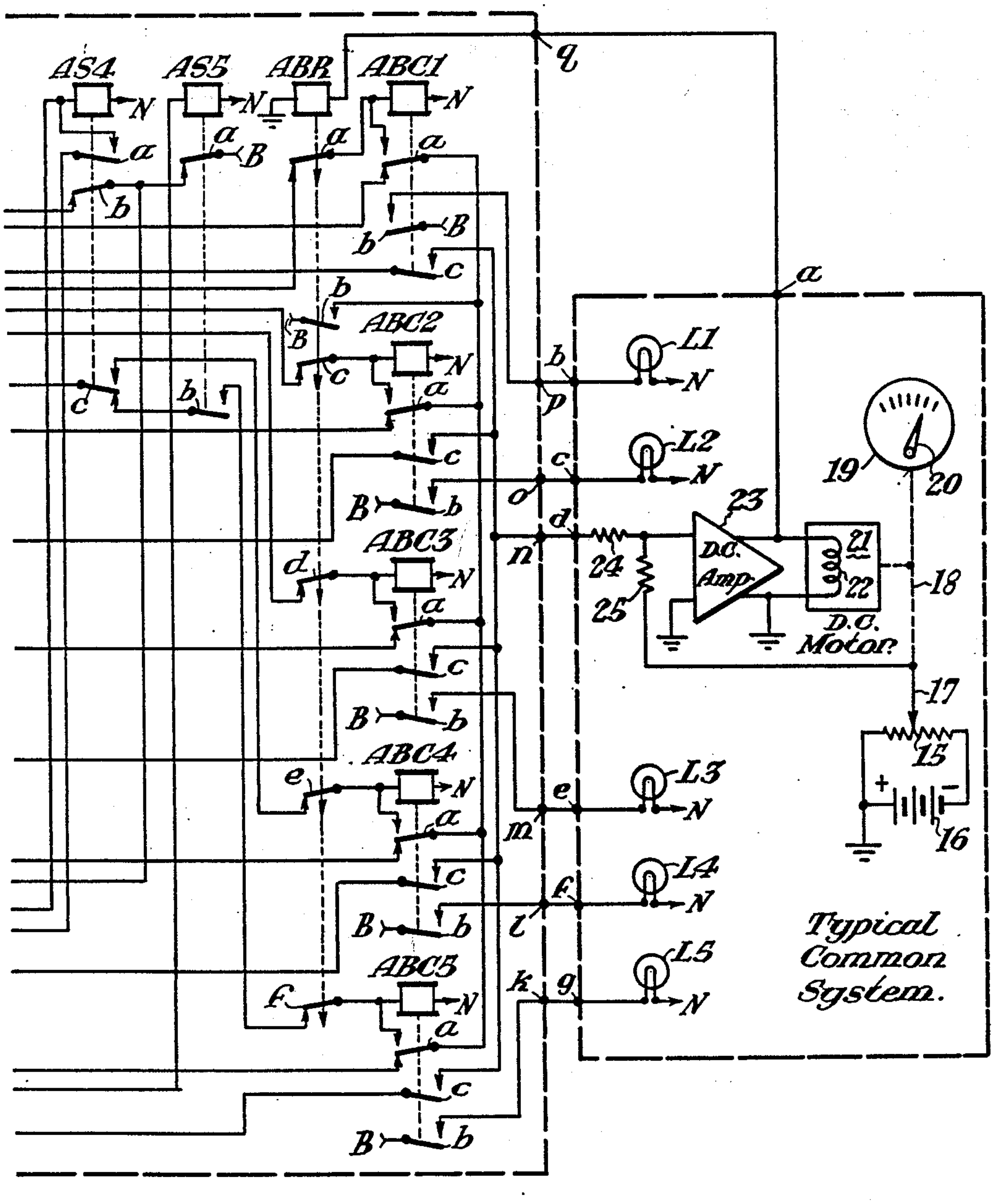
Figure 2A:
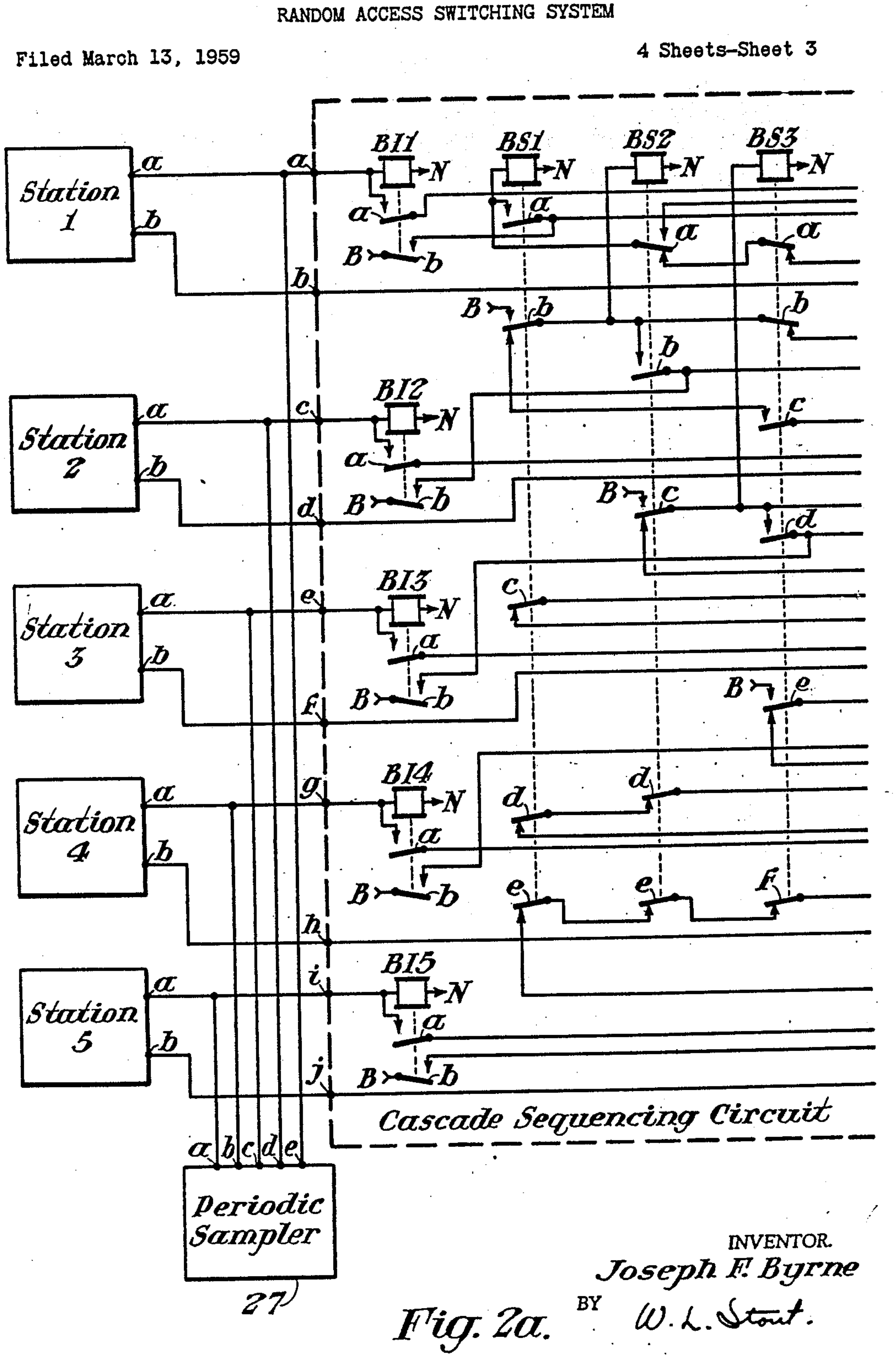
Figure 2B:
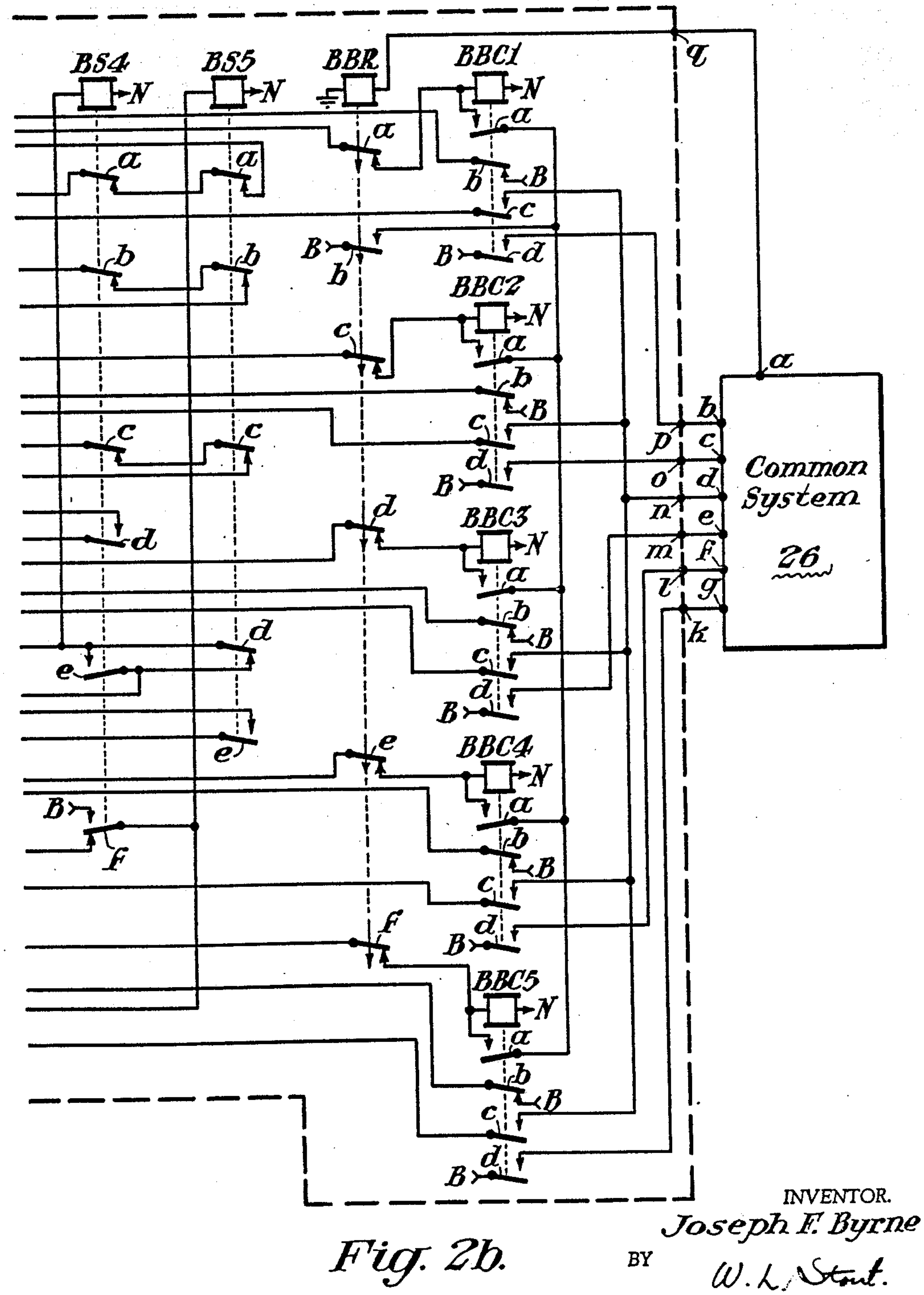

The details of the above-described embodiments of my invention will best be understood from the following description when read in connection with the accompanying drawings, in which FIGS. 1*a* and 1*b*, when placed vertically side by side with FIG. 1*a* at the left, comprise a schematic wiring diagram of a first embodiment of my invention;

FIGS. 2*a* and 2*b*, when placed vertically side by side with FIG. 2*a* at the left, comprise a schematic wiring diagram of a second embodiment of my invention.

In the drawings, operating voltage for many of the relays is assumed to be provided by a suitable conventional source of direct current, such as a battery, not shown, but indicated on the drawings by its positive terminal B and its negative terminal N associated with arrow symbols as shown. Certain elements of the apparatus to be described are operated from additional sources, which are shown, and which are provided with a common ground or return circuit having a reference potential indicated by the conventional ground symbol in the drawings.

Referring now to FIGS. 1*a* and 1*b*, as illustrated, a first embodiment of my invention is adapted to connect an input from any one of five field stations to a typical common system. In order to avoid the complexity attendant on a showing of the details of an actual centralized transport control system, I have illustrated both the station and the common system equipment by relatively simple apparatus which nevertheless performs the essential functions of the more complex apparatus ordinarily encountered. For example, I have indicated each input as comprising a signal supplied over a single line, whereas in practice it might be that a large number of such lines, or a serial train of distinct inputs on one or more lines, would constitute an input. However, as will appear, these details are immaterial to the operation of the switching system of my invention, and they will, accordingly, not be further elaborated.

Referring specifically to FIG. 1*a*, the equipment shown for typical station 1 may be assumed to be the same as that provided for stations 2 through 5. As shown, this equipment includes an input transducer such as a Bourdon tube 11 which is assumed to move in a manner known to the art in response, for example, to an applied pressure.

Bourdon tube 11 is connected to move a wiper 10 on a resistance 9 connected across a battery 8. Battery 8 has its negative terminal grounded, as shown, and a positive signal accordingly appears on wiper 10 and hence on output terminal *b* of the station unit in accordance with the position of the wiper as controlled by Bourdon tube 11.

In order to indicate a rapid change in pressure, a capacitor 7 is coupled between wiper 10 and one input terminal of a conventional D.C. amplifier 6, as shown. Accordingly, the amplifier will produce an output only in response to a change in pressure. Obviously, a rapid change in pressure will produce a change in voltage which will be coupled to the amplifier through capacitor 7.

The output of amplifier 6 is connected to the coil of a suitable direct current relay SR1. This relay is accordingly picked up when a change in pressure occurs, and will thereafter remain picked up while the change persists.

Relay SR1 is provided with a single front contact *a*, as shown, which is connected between terminal B of the battery and output terminal *a* of station 1. Terminal *a* is thereby energized to indicate a request by the station for processing of the signal in accordance with the pressure which appears on station terminal *b*.

In order to illustrate a plurality of inputs which have periodic as well as random processing requirements, I have shown a periodic sampler 12 comprising a conventional clock drive 13 moving a wiper 14 over a series of contacts connected to output terminals *a* of each of the stations, as shown. Wiper 14 has one terminal connected to terminal B of the battery. It will thus appear that, with the clock drive moving at a constant rate, an input processing request signal is applied for each station at fixed intervals. For example, the clock drive might be designed to rotate at such a rate that each station is provided with a process signal request once every ten minutes.

It will be apparent from the above description that terminals *a* of stations 1 through 5 are periodically energized by sampler 12, and in addition may be energized at random intervals whenever the station output on its terminal *b* undergoes a relatively rapid change.

Referring now to FIG. 1*b*, I have illustrated a typical common system as comprising an indicator controlled by a servomechanism and a plurality of station indicating lamps. In particular, the typical common system has a first input terminal *d* to which a signal such as a pressure signal of the type appearing on terminals *b* of the above-described stations may be applied. The signal appearing between input terminal *d* of the common system and ground is applied to the input of a conventional D.C. amplifier 23 through a summing resistor 24.

Amplifier 23 has its output connected across the coil 22 of a D.C. motor 21, which is assumed to be a conventional servomotor of the type well known in the art. Amplifier 23 may be of the type in which a positive or negative output is provided with respect tog round in accordance with the polarity of the input. Accordingly, motor 21 will be driven in one direction or the other by the amplifier in accordance with the polarity of the amplifier input.

A conventional followup circuit for servomotor 21 is provided by a means of wiper 17 adjusted on a resistance 15 which is connected across a battery 16 as shown. The positive terminal of battery 16 is grounded as shown and wiper 17 is connected to the input terminal of amplifier 23 through a summing resistor 25. Accordingly, a negative signal of a magnitude depending on the position of wiper 17 is applied to the input of amplifier 23.

As shown, motor 21 is provided with mechanical connections 18 for driving wiper 17 and at the same time moving an indicator needle 20 on a dial 19.

It will be apparent that I have described an indicating servomotor, of a type well known in the art, which positions an indicator in accordance with the magnitude of an applied signal, at the same time driving a followup potentiometer to balance out the input signal. Accordingly, between the time that an input signal is applied and the time that the servomechanism is balanced, a voltage will appear across the output of amplifier 23, which is connected to an output terminal *a* of the common system as shown. Thus, terminal *a* will be energized during the time when the servomechanism of the common system is engaged in processing a signal.

Terminals *b*, *c*, *e*, *f* and *g* of the common system are shown connected through the filaments of a plurality of station indicating lamps L1, L2, L3, L4 and L5, respectively, to terminal N of the battery. Accordingly, each lamp will be lit to indicate that a signal from its corresponding station is being processed when its corresponding input terminal is energized.

The apparatus next to be described, which comprises a first embodiment of my invention, is adapted, in response to energization of one or more of terminals *a* of the station units, to connect terminal *b* of the first requesting station, or a preferred one of simultaneously requesting stations, to terminal *d* of the common system, to energize the appropriate station lamp input terminal of the common system, and to store requests from stations waiting to be processed. The details of the circuits for performing these functions will now be described.

For convenience in describing my invention, I have shown certain groups of components enclosed by dotted lines provided with arbitrarily designated terminals through which inputs and outputs are connected. It should be remembered that this is done only for expository convenience, and that these terminals would not necessarily have any definite physical counterpart in practice.

As shown in FIG. 1*a*, I provide a plurality of input relays AI1, AI2, AI3, AI4 and AI5, corresponding respectively to each of stations 1 through 5. Each of these relays has an obvious pickup circuit extending from terminal *a* of the corresponding station, which may also be energized from periodic sampler 12 as previously described, and which circuit is completed through the coil of the relay to terminal N of the battery. Each input relay is accordingly energized when its corresponding station requests signal processing.

Each of the input relays AI1 through AI5 is provided with a stick circuit including its own front contact *a* and the back point of contact *a* of a corresponding relay ABC1 through ABC5 in FIG. 1*b*, to be described, and each of these stick circuits extends over front contact *b* of a "busy relay" ABR, to be described, to terminal B of the battery. Each AI relay, when picked up, is thus held up as long as relay ABR is energized and the corresponding ABC relay is released. The purpose of this stick circuit will be made clear hereinafter.

As shown in FIGS. 1*a* and 1*b*, I provide a series of sequence relays AS1, AS2, AS3, AS4 and AS5 associated respectively with the correspondingly numbered AI relays. Each sequence relay has a pickup circuit which includes a front contact of its corresponding AI relay and a back contact of each of the higher ordered sequence relays. In particular, relay AS1 has a pickup circuit extending from terminal B of the battery over back contact *a* of relay AS5, back contact *b* of relay AS4, back contact *b* of relay AS3, back contact *b* of relay AS2, and front contact *b* of relay AI1. Relay AS2 has a pickup circuit extending from terminal B of the battery over back contact *a* of relay AS5, back contacts *b* of relays AS3 and AS4, and front contact *b* of relay AI2. Relay AS3 has a pickup circuit extending from terminal B of the battery over back contact *a* of relay AS5, back contact *b* of relay AS4, and front contact *b* of relay AI3. Relay AS4 has a pickup circuit extending from terminal B of the battery over back contact *a* of relay AS5 and front contact *b* of relay AI4. Relay AS5 has a pickup circuit extending from terminal B of the battery over front contact *b* of relay AI5.

Each of the AS relays except relay AS5 is provided with a stick circuit which includes its own front contact *a* and front contact *c* of the corresponding AI relay, as shown in the drawings. Relay AS5 is not provided with a separate stick circuit, since its pickup circuit is directly controlled by relay AI5. These stick circuits, and the pickup circuit for relay AS5, serve to maintain the AS relays energized after they have been energized until the corresponding AI relay is released.

As shown in FIG. 1*b*, I provide a plurality of bus connector relays ABC1, ABC2, ABC3, ABC4 and ABC5, corresponding respectively to correspondingly numbered AI and AS relays. Each of the ABC relays is provided with a pickup circuit which includes a front contact of its associated AS relay, a back contact of all lower ordered AS relays, and a back contact of slow release relay ABR, to be described. In particular, relay ABC1 has a pickup circuit extending from terminal B of the battery over the front point of contact *b* of relay AS1 and back contact *a* of relay ABR. Relay ABC2 has a pickup circuit extending from terminal B of the battery over the back point of contact *b* of relay AS1, the front point of contact *c* of relay AS2 and back contact *c* of relay ABR. Relay ABC3 has a pickup circuit which extends from terminal B of the battery over the back point of contact *b* of relay AS1, the back point of contact *c* of relay AS2, the front point of contact *c* of relay AS3, and back contact *d* of relay ABR. Relay ABC4 has a pickup circuit which extends from terminal B of the battery over the back point of contact *b* of relay AS1, the back points of contacts *c* of relays AS2 and AS3, the front point of contact *c* of relay AS4 and back contact *e* of relay ABR. Relay ABC5 has a pickup circuit which extends from terminal B of the battery over the back point of contact *b* of relay AS1, the back points of contacts *c* of relays AS2, AS3 and AS4, front contact *b* of relay AS5, and back contact *f* of relay ABR. An ABC relay, as will be seen from the above description, can thus be picked up only if the corresponding AS relay is picked up and any lower ordered AS relays are released.

Each of the ABC relays is provided with a stick circuit including its own front contact *a* and front contact *b* of slow release relay ABR. Accordingly, the ABC relays, once picked up, are held up as long as relay ABR is energized. In a manner known to the art, relay ABR may be constructed so that its front contact *b* is closed before its back contacts are opened, to insure continuity of energization for the ABC relays.

Each of the ABC relays is provided with a front contact *b* for energizing the corresponding station lamp L, as shown in FIG. 1*b*. A circuit from terminal *b* of each station extends over an additional front contact *c* of the corresponding ABC relay, as shown, to input terminal *d* of the common system.

Relay ABR is energized by a circuit extending from terminal *a* of the common system and through its winding to ground. Accordingly, relay ABR is picked up as soon as the common system becomes engaged in processing an input signal, and energization is maintained until the common system is substantially finished processing the input. Thus, relay ABR may be termed a "busy relay." Relay ABR is made somewhat slow to release, as indicated in FIG. 1*b*, to ensure that it will not be released until the common system is completely through with a processing operation. In addition, as previously noted, the contacts of relay ABR may be arranged in a manner well known in the art so that its front contact *b* will be closed before its back contacts are opened.

The structure of this embodiment of my invention having been described, its operation in general will now be described, and its operation under specific typical conditions will then be described.

As will appear from the above circuit description, each of the AI relays will be energized when it is desired to process a signal from the corresponding station, as evidenced by energy applied to terminal *a* of the associated station, either from within the station in response to a rapid change in pressure, or in response to the periodic action of sampler 12. As each AI relay is energized, it attempts to energize its corresponding AS relay. This may be accomplished only if higher ordered AS relays are deenergized. When the selected AS relay is energized, it will attempt to energize the corresponding ABC relay. This can be accomplished only if all of the lower ordered AS relays are deenergized. Accordingly, only one ABC relay can be energized at a time. It will be apparent that the same result could be obtained by picking up the AS relays over back contacts of lower ordered AS relays and picking up the ABC relays over back contacts of higher ordered AS relays, if so desired.

When an ABC relay is energized, it energizes the corresponding station lamp in the common system and connects terminal *b* of the corresponding station to terminal *d* of the common system. The servomechanism of the common system then operates to balance out the input signal and to indicate the value of pressure by the position of needle 20 on dial 19. During the balancing operation, terminal *a* of the common system is energized, and relay ABR is accordingly energized. As long as relay ABR is energized, any AI relay which has not been able to complete a circuit connection to pick up its corresponding ABC relay is held up over a back contact of the corresponding ABC relay and front contact *b* of relay ABR. When the balancing operation is finished, and relay ABR is released after its time delay period, another AI relay may complete a connection for its input and the operation will be repeated. Once a station signal has been processed, it cannot be processed again until all waiting inputs have been processed.

The above-described operation of this embodiment of my invention will be illustrated by several typical examples. First, consider the case in which only one of the station terminals *a*, for example, of station 1, is energized. Relay AI1 will now be energized over front contact *a* of relay SR1, which is assumed to be operated in the manner previously described in response to a relatively rapidly changing input. However, the same operation would follow if terminal *e* of periodic sampler 12 had been energized in the normal course of its cycle.

With relay AI energized, relay AS1 is now energized over a circuit extending from terminal B of the battery over back contact *a* of relay AS5, back contacts *b* of relays AS4, AS3 and AC2, and front contact *b* of relay AI1. Relay AS1 will then complete a stick circuit over its own front contact *a* and front contact *c* of relay AI1.

With relay AS1 energized, relay ABC1 will be picked up over a circuit extending from terminal B of the battery over the front point of contact *b* of relay AS1 and back contact *a* of relay ABR. With relay ABC1 energized, lamp L1 will be energized over front contact *b* of relay ABC1 to indicate that a signal from station 1 is being processed. At the same time, terminal *b* of station 1 will be connected to terminal *d* of the common system over front contact *c* of relay ABC1. The common system servomechanism will now begin to operate to indicate the pressure at station 1 and to balance out the input signal.

While the servomechanism is balancing, its terminal *a* will be energized and relay ABR will be picked up. The pickup circuits for the remaining ABC relays will then be interrupted at the open back contacts of relay ABR.

With relay ABR picked up, a stick circuit for relay ABC1 will be established over its own front contact *a* and front contact *b* of relay ABR. When the servomechanism of the common system is balanced, relay ABR will be deenergized and relay ABC1 will release.

It is assumed that during the processing operation, either relay SR1 drops away or wiper 14 moves past its interval of contact to deenergize terminal *e* of sampler 12, and relay AI1 is thus released. This sequence of operation is enforced, first by the timed release of relay ABR, and secondly by the fact that relay SR1 will release when the station pressure is stabilized, which must occur before the servomechanism can be balanced. It is to be noted that the stick circuit for relay AI1 is interrupted as soon as relay ABC1 is energized and opens its back contact *a*.

With relay AI1 deenergized, both the pickup and stick circuits for relay AS1 are broken and relay AS1 will be released.

When relay ABR is released, the stick circuit for relay ABC1 will be interrupted and relay ABC1 will be released, restoring the apparatus to its initial condition.

As a second example, assume that the preceding events leading to the pickup of relay ABC1 have occurred, and that station 1 is connected to the common system with relays ABC1, ABR, AI1 and AS1 energized. Assume now that relay AI3 becomes energized in response to a request from station 3 or terminal *c* of periodic sampler 12.

With relay AI3 energized, and relays AS4 and AS5 released, relay AS3 will now be energized over a circuit extending from terminal B of the battery over back contact *a* of relay AS5, back contact *b* of relay AS4, and front contact *b* of relay AI3.

Relay AS3 will now be held up over front contact *c* of relay AI3 and its own front contact *a*, with relay AS1 still held up over its own front contact *a* and front contact *c* of relay AI1.

Relay AS3 will now attempt to pick up relay ABC3, but this cannot occur as long as the back point of contact *b* of relay AS1 is open.

Relay AI3 will now be held up over its own front contact *a*, the back point of contact *a* of relay ABC3 and front contact *b* of relay ABR.

Relay AI1 will be deenergized before relay ABR is released, because relay SR1 or the corresponding sampler terminal will be deenergized before the servomechanism is stabilized, and if not, before slow release relay ABR can be released. When relay AI1 releases, relay AS1 will be released.

With relay AS3 energized as previously stated, as soon as relay ABR releases, relay ABC3 will be picked up over its previously traced pickup circuit including the back point of contact *b* of relay AS1, the back point of contact *c* of relay AS2, the front point of contact *c* of relay AS3 and back contact *d* of relay ABR. Station 3 will then be connected to the common system and the previously described operation will continue until the common system has finished the processing of the signal from station 3.

Next, assume that relays AI2 and AI4 are simultaneously energized. If relay AI2 closes its front contact *b* at the same time that relay AI4 closes its front contact *b*, it may happen that relays AS2 and AS4 are simultaneously energized. However, only one of relays ABC2 and ABC4 can be energized.

If relay AS4 was operated just ahead of relay AS2 and closed the front point of its contact *c* before the back point of contact *c* of relay AS2 was opened, relay AS4 would have already opened the back point of its contact *b*, thus interrupting the pickup circuit for relay AS2 before its front contact *a* could close to complete its stick circuit. If relay AS2 were operated just ahead of relay AS4, it would open the back point of its contact *c* before relay AS4 could close the front point of its contact *c*. Thus, the circuit for relay ABC4 would be interrupted. If relays AS2 and AS4 operate at exactly the same time, the same situation would occur, because the back point of contact *c* of relay AS2 will open at the same time that the back point of contact *c* of relay AS4 opens and before contact *c* of relay AS4 closes on its front point. It will thus be seen that in the case of one relay operated before another, the first operated relay will take precedence. For simultaneously operated relays, the lower numbered relay will take precedence by interrupting the output circuit for the higher numbered relay.

Referring now to FIGS. 2*a* and 2*b*, I have shown a second embodiment of my invention which is adapted to operate as a component of the same overall system described in connection with FIGS. 1*a* and 1*b*. That is, stations 1 through 5 in FIG. 2*a* may be constructed in the same manner as stations 1 through 5 in FIG. 1*a*. Periodic sampler 27 in FIG. 2*a* may correspond to periodic sampler 12 in FIG. 1*a*. Common system 26 in FIG. 2*b* may correspond to the typical common system shown in FIG. 1*b*. All of the terminal designations in FIGS. 2*a* and 2*b* have the same significance as the corresponding terminal designations in FIGS. 1*a* and 1*b*. The structure and operation of the common portions of the overall system will be assumed without further detailed discussion to be the same as described above in connection with FIGS. 1*a* and 1*b*.

As will be seen from the drawings, similar relays in FIGS. 2*a* and 2*b* are given similar designations to approximately corresponding relays in FIGS. 1*a* and 1*b*, except that the relays in FIGS. 1*a* and 1*b* have been given the prefix A and those in FIGS. 2*a* and 2*b* have been given the prefix B, so that the two modifications may be readily distinguished for reference purposes.

Referring now to FIG. 2*a*, I have provided a plurality of input relays BI1 through BI5, each of which are energized either from terminal *a* of the corresponding station or a corresponding one of the sampler output terminals in the same manner as previously described for the AI relays in FIG. 1*a*. However, each of these relays is provided with a somewhat different stick circuit than that provided in the previous modification.

As shown, this stick circuit for each of the BI relays extends from terminal B of the battery over back contact *b* of the corresponding BBC relay in FIG. 2*b*, to be described, and front contact *a* of the BI relay. The BI relays are accordingly held up, once picked up, until the corresponding BBC relay is picked up.

As shown in FIGS. 2*a* and 2*b*, I provide a sequence relay corresponding to each input relay and designated as BS1, BS2, BS3, BS4 and BS5. Each of the BS relays has a pickup circuit which includes front contact *b* of the corresponding BI relay and back contacts of each of the higher ordered BS relays. For example, the pickup circuit for relay BS4 extends from terminal B of the battery over front contact *b* of relay BI4, back contact *d* of relay BS5 and through the winding of relay BS4 to terminal N of the battery. Since there is no higher ordered relay than BS5, its pickup circuit includes only front contact *b* of relay BI5. Each of the BS relays, except relay BS1, has a second pickup circuit which includes a front contact of the next lower ordered BS relay. For example, the second pickup circuit for relay BS3 extends from terminal B of the battery over the front point of contact *c* of relay BS2. Similar circuits are provided for relays BS, BS4 and BS5, as will be obvious from FIGS. 2*a* and 2*b*.

Each of the BS relays, except relay BS5, is provided with a stick circuit which includes one of its own front contacts and front contact *b* of the corresponding BI relay. In particular, the stick circuit for relay BS2 includes front contact *b* of relay BI2 and its own front contact *b*. The stick circuit for relay BS3 includes front contact *b* of relay BI3 and its own front contact *d*. The stick circuit for relay BS4 includes front contact *b* of relay BI4 and its own front contact *e*. The stick circuit for relay BS1 includes front contact *b* of relay BI1 and its own front contact *a*. Since relay BS5 is picked up over a first circuit which includes only front contact *b* of relay BI5, it does not require a corresponding stick circuit.

As shown in FIG. 2*b*, I provide bus connector relays BBC1 through BBC5 corresponding respectively to the correspondingly numbered input relays BI and sequence relays BS. Each of the bus connector relays BBC1 through BBC5 is provided with a pickup circuit which includes a back contact of relay BBR, to be described, a front contact of the corresponding BI relay, a front contact of the corresponding BS relay, a front contact of the next higher ordered BS relay, and back contacts of the lower ordered BS relays, as will now be described.

The pickup circuit for relay BBC1 extends from terminal B of the battery over front contact *b* of relay BI1, front contact *a* of relay BS1, the front point of contact *a* of relay BS2, back contact *a* of relay BBR, and thence through the winding of relay BBC1 to terminal N of the battery. The pickup circuit for relay BBC2 includes front contact *b* of relay BI2, front contact *b* of relay BS2, the back point of contact *b* of relay BS1, front contact *c* of relay BS3, and back contact *c* of relay BBR. The pickup circuit for relay BBC3 includes front contact *b* of relay BI3, front contact *d* of relay BS3, the back point of contact *c* of relay BS2, front contact *d* of relay BS4, back contact *c* of relay BS1, and back contact *d* of relay BBR. The pickup circuit for relay BBC4 includes front contact *b* of relay BI4, front contact *e* of relay BS4, the back point of contact *e* of relay BS3, front contact *e* of relay BS5, back contacts *d* of relays BS1 and BS2, and back contact *e* of relay BBR. The pickup circuit for relay BBC5 includes front contact *b* of relay BI5, the back point of contact *f* of relay BS4, back contact *f* of relay BS3, back contacts *e* of relays BS1 and BS2, and back contact *f* of relay BBR.

Each of the BBC relays is provided with a stick circuit which includes its own front contact *a* and front contact *b* of relay BBR. Each operated BBC relay is accordingly held up as long as relay BBR remains energized.

As shown, each of the BBC relays is provided with a station lamp energizing circuit extending from terminal B of the battery over front contact *d* of each BBC relay to a lamp energizing terminal *b*, *c*, *e*, *f*, or *g*, as shown in FIG. 2*b*.

A station connecting circuit for each station extends from terminal *b* of the station over front contact *c* of the corresponding BBC relay to input terminal *d* of the common system 26.

As shown in FIG. 2*b*, I provide a relay BBR which may be controlled, in the same manner as relay ABR in FIG. 1*b*, from terminal *a* of common system 26. As shown, relay BBR is made slow to release by conventional methods, and, as described in connection with relay ABR, it is constructed so that its front contact *b* is closed before its back contacts are opened. In the operation of the system, relay BBR is accordingly energized as long as the common system is operated and unbalanced, and remains picked up for a short time after the balance of the common system is reached.

The structure of this embodiment of my invention having been described, its operation under various typical conditions will now be described. In discussing the operation of this embodiment of my invention, the detailed operation of the station and common system equipment will not be considered, since it has already been discussed in connection with the embodiment of FIGS. 1*a* and 1*b*. Accordingly, a request for operation will be considered to be initiated by the energization of the corresponding BI relay, and the operation will be considered to continue until relay BBR is released.

If only one of the BI relays is operated, the connection of the corresponding station to the common system occurs in a manner somewhat similar to that described for the previous embodiment. That is, assuming, for example, that relay BI3 is energized, it will be temporarily held up over its stick circuit including its own front contact *a* and back contact *b* of relay BBC3. Relay BS3 will now be picked up over its first previously described pickup circuit including front contact *b* of relay BI3 and back contacts *c* of relays BS4 and BS5. Relay BS3 will then be held up over its previously described stick circuit including its own front contact *d* and front contact *b* of relay BI3.

With relay BS3 energized, relays BS4 and BS5 are energized in cascade, relay BS4 being energized over the front point of contact *e* of relay BS3, and relay BS5 then being energized over the front point of contact *f* of relay BS4.

Relay BBC3 will now be energized over its previously described pickup circuit including front contact *b* of relay BI3, front contact *d* of relay BS3, the back point of contact *c* of relay BS2, front contact *d* of relay BS4, back contact *c* of relay BS1, and back contact *d* of relay BBR.

With relay BBC3 energized, terminal *b* of station 3 will be connected to input terminal *d* of common system 26 over front contact *c* of relay BBC3. The common system will then commence to balance, and during this operation, relay BBR will be energized. With relay BBR picked up, the stick circuit for relay BBC3 is completed over its own front contact *a* and front contact *b* of relay BBR. Assuming that relay BI3 now releases, the previously traced stick circuit for relay BS3 will be interrupted and relay BS3 will release. Since no stick circuits were completed for relays BS4 and BS5, these relays will now be released due to the interruption of their pickup circuits, with relay BS4 being first released and relay BS5 being next released.

When relay BBR eventually releases, relay BBC3 will be released and the system will be restored to its initial condition.

In order to understand the operation of this embodiment of my invention for simultaneous inputs, let it be abssumed that all of the relays BI1 through BI5 are simultaneously energized. Under these conditions, it is possible that all of the BS relays BS1 through BS5 would be simultaneously energized and then held up over their stick circuits including front contacts *b* of the corresponding BI relays. Should any of the BS relays fail to operate, due to a higher ordered BS relay previously opening its back contacts, the unoperated relay would either be operated by the energization of the next lower actuated BS relay or would remain unoperated. In either event, the corresponding BI relay would remain held up over back contact *b* of the corresponding BBC relay. However, for present purposes, it will be assumed that all of the BS relays are energized and have completed their stick circuits.

Of the BBC relays, relays BBC2 through BBC5 cannot pick up because all of their pickup circuits are interrupted at least at an open back contact of relay BS1. These relays will accordingly remain deenergized for the time being and will continue to hold up their associated BI relays.

On the other hand, relay BBC1 will be picked up over its energizing circuit including front contact *b* of relay BI1, front contact *a* of relay BS1, the front point of contact *a* of relay BS2, and back contact *a* of relay BBR. Relay BBR will now be picked up due to the operation of the common system, and will hold up relay BBC1 over its own front contact *a* and front contact *b* of relay BBR.

When the sampler circuit is opened, or when the output of station 1 becomes stabilized, whichever initiated the request for processing, relay BI1 will be released. With relay BI1 released, the stick circuit for relay BS1 will be interrupted and this relay will release. Station 2 can now be connected after the common system 26 has finished processing the input from station 1 and relay BBR is released. To accomplish this connection, relay BBC2 will now be picked up over its previously traced circuit including front contact *b* of relay BI2, front contact *b* of relay BS2, the back point of contact *b* of relay BS1, front contact *c* of relay BS3, and back contact *c* of relay BBR. When relay BBC2 picks up, terminal *b* of station 2 will be connected to terminal *d* of common system 26 over front contact *c* of relay BBC2.

Upon the connection of station 2 to the common system, the previously described sequence of events including the pickup of relay BBR, the sequential release of relays BI2 and BS2, and finally the release of relay BBR, will take place. When this occurs, relay BBC3 will be picked up over its previously traced circuit including front contact *b* of relay BI3, front contact *d* of relay BS3, the back point of contact *c* of relay BS2, front contact

*d* of relay BS4, back contact *c* of relay BS1 and back contact *d* of relay BBR. Relay BBC3 will now connect station 3 to common system 26 and relay BBR will again be picked up.

At this point, the situation in which a lower ordered input relay is again energized will be considered. For example, assume that relay BI1 is again picked up. As before, it will be held up over back contact *b* of relay BBC1. However, it cannot pick up sequence relay BS1 at this time because the pickup circuits for that relay are interrupted at the open back contacts of energized higher order BS relay in its pickup circuit. Accordingly, once an input has been processed, it cannot be reprocessed until all waiting inputs have been processed.

It will next be assumed that relays BI3 and BS3 are released, and that relay BBR becomes released. Relay BBC4 can now be picked up over its previously traced energizing circuit including front contact *b* of relay BI4, front contact *e* of relay BS4, the back point of contact *e* of relay BS3, front contact *e* of relay BS5, back contacts *d* of relays BS2 and BS1, and back contact *e* of relay BBR. The station will now be connected to the common system and relay BBR will again be picked up.

Assuming the subsequent release of relays BI4 and BS4, and the release thereafter of relay BBR, relay BBC5 will next be picked up over its previously traced circuit including front contact *b* of relay VI5, the back points of contacts *f* of relays BS3 and BS4, back contacts *e* of relays BS1 and BS2, and back contact *f* of relay BBR. Relay BBC5 will then pick up to connect station 5 to the common system. After this operation has been completed by the release of relay BBR, any previously waiting inputs, in the present example, relay VI1, energized as previously described, can now be connected to the common system. Obviously, if there is more than one such waiting input, the connection sequence will be in cascade as described above.

It will be apparent that I have described two embodiments of my invention, each capable of sequencing randomly occuring inputs to a common circuit. However, while I have described only two such embodiments, it will appear to those skilled in the art after reading my description that various changes and modifications can be made in the structure shown without departing from my invention. Accordingly, I do not wish to be limited to the details shown, but only by the scope of the following claims.

Having thus described my invention, what I claim is:

1. A chain sequencing circuit for connecting one at a time a plurality of input circuits to a common circuit in response to randomly occurring demand signals each associated with an input circuit, comprising, in combination, a plurality of input circuit terminals, a source of demand signals, one for each input circuit terminal, a first plurality of relays, means for energizing each of said relays by one of said demand signals, an ordered plurality of sequence relays, means controlled by each of said first relays when energized and any higher ordered sequence relays when deenergized for energizing one of said sequence relays, a plurality of connector relays, means controlled by each sequence relay when energized and any lower ordered sequence relays when deenergized for energizing one of said connector relays, a common circuit terminal, and means controlled by each connector relay for connecting one of said input circuits to said common circuit terminal.

2. A cascade sequencing circuit for connecting one at a time a plurality of input circuits to a common circuit in response to randomly occurring demand signals each associated with an input circuit, comprising, in combination, a plurality of input terminals, a plurality of demand signal terminals, one for each input terminal, a plurality of input relays, one for each input terminal, means for energizing each input relay over a different one of said demand signal terminals, a plurality of ordered sequence relays, one for each input relay, first means controlled by one of said input relays when energized and any higher ordered sequence relays when deenergized for energizing each of said sequence relays, second means controlled by the next lower ordered sequence relay when energized for energizing each sequence relay except the first, a plurality of connector relays, one for each sequence relay, means controlled by each sequence relay when energized, its corresponding input relay when energized, any next lower ordered sequence relay when deenergized, and any next higher ordered sequence relay when energized for energizing one of said connector relays, an output terminal, and means controlled by each connector relay for connecting one of said input terminals to said output terminal.

3. Apparatus of the class described, comprising, in combination, a first ordered array of relays having energized and deenergized conditions, a second array of relays having energized and deenergized conditions, one for each first relay and correspondingly ordered, a third group of relays having energized and deenergized conditions, one for each second relay and correspondingly ordered, an energizing circuit for each second relay closed by its corresponding first relay in its energized condition and any higher ordered second relays in their deenergized conditions, and an energizing circuit for each of said third relays closed by its corresponding second relay in its energized condition and any lower ordered second relays in their deenergized conditions.

4. In combination, a first ordered array of relays having energized and deenergized conditions, a second array of relays having energized and deenergized conditions, one for each first relay and correspondingly ordered, a third group of relays having energized and deenergized conditions, one for each second relay and correspondingly ordered, a first energizing circuit for each second relay closed by its corresponding first relay in its energized condition and any higher ordered second relays in their deenergized condition, a second energizing circuit for each second relay except the lowest ordered closed by the next lowest ordered relay in its energized condition, and an energizing circuit for each third relay closed by its corresponding first and second relays in their energized conditions and any lower ordered second relays in their deenergized conditions.

5. A random access circuit for sequentially connecting a plurality of parallel inputs to a common output, comprising, in combination, a plurality of input storage devices each having an energizing circuit and an energization holding circuit, a sequence device for each storage device having deenergized and energized conditions, the plurality of sequence devices having a preselected ordered array, a connecting device for each sequence device having deenergized and energized conditions, means for energizing the corresponding sequence device controlled by each storage device in its energized condition and the sequence devices ordered in a first direction from said corresponding sequence device in their deenergized conditions, means controlled by each sequence device in its energized condition and the remainder of said sequence devices ordered in the direction opposite said first direction from that sequence device in their deenergized conditions for energizing the corresponding connecting device, the plurality of connecting devices being successively energized in a sequence predetermined by the ordered array of said sequence devices, a common output, means controlled by each connecting device in its energized condition for connecting a different input to said output, and means controlled by each connecting device in its deenergized condition for energizing a corresponding holding circuit.

6. In combination, a source of input signals, a source of demand signals, one for each input signal, a storage device for each demand signal, means for energizing each storage device in response to its corresponding demand signal, an ordered array of sequence devices, one for each storage device, a connecting device, one for each sequence device, means for energizing each given sequence device controlled by all sequence devices ordered in a first sense from the given sequence device when deenergized and its corresponding storage device when energized, means for energizing each connecting device controlled by its corresponding sequence device when energized and all sequence devices ordered opposite said first sense from the corresponding sequence device when deenergized, a common circuit, means controlled by each connecting device when energized for connecting its corresponding input signal to said common circuit, and means controlled by each connecting device when deenergized and its corresponding storage device when energized for maintaining the corresponding storage device energized.

7. In combination, a plurality of input terminals, means for energizing each terminal at random intervals, a first series of relays each connected for energization by one of said terminals, a second relay for each first relay, said second relays comprising an ordered array, an energizing circuit for each second relay of a given order controlled by its corresponding first relay in its energized condition and any second relays ordered in one sense from said given order in their deenergized conditions, a third relay for each second relay, an energizing circuit for each third relay controlled by its corresponding second relay in its energized condition and any second relays ordered in an opposite sense from said corresponding relay in their deenergized conditions, an indication circuit for each input terminal controlled by a contact of the corresponding third relay.

8. A random access circuit, comprising, in combination, a first terminal adapted to be energized with a first information signal, a second terminal associated with said first terminal and adapted to be energized with a first demand signal, a third terminal adapted to be energized with a second information signal, a fourth terminal associated with said third terminal and adapted to be energized with a second demand signal, a first relay, means connected to said second terminal for energizing said first relay in response to energization of said second terminal, a second relay, means connected to said fourth terminal for energizing said second relay in response to energization of said fourth terminal, a third relay, a fourth relay, means controlled by said first relay in its energized condition for energizing said third relay, means controlled by said second relay in its energized condition and said first relay in its deenergized condition for energizing said fourth relay, a fifth relay, a sixth relay, a slow release relay, means controlled by said third relay in its energized condition, said fourth relay in its deenergized condition and said slow release relay in its deenergized condition for energizing said fifth relay, means controlled by said fourth relay in its energized condition and said slow release relay in its deenergized condition for energizing said sixth relay, a common information processing circuit having an energized condition while processing a signal, means for energizing said slow release relay from said common circuit in its energized condition, means controlled by said fifth relay in its energized condition for connecting said first terminal to said common circuit, means controlled by said sixth relay in its energized condition for connecting said third terminal to said common circuit, a stick circuit for said first relay controlled by said fifth relay in its deenergized condition and said slow release relay in its energized condition, and a stick circuit for said second relay controlled by said sixth relay in its deenergized condition and said slow release relay in its energized condition.

9. In combination, first, second and third input relays having energized and deenergized conditions, three sequence relays each corresponding to a different one of said input relays and having energized and deenergized conditions, three connector relays each corresponding to a different one of said input relays and having energized and deenergized conditions, means for energizing said input relays at random intervals, stick circuit means for each input relay comprising a contact closed by its corresponding connector relay in its deenergized condition, an energizing circuit for a first sequence relay closed by said first input relay in its energized condition and the remaining sequence relays in their deenergized conditions, a first energizing circuit for a second sequence relay closed by said first sequence relay in its energized condition, a second energizing circuit for said second sequence relay closed by said second input relay in its energized condition and the remaining sequence relay in its deenergized condition, a first energizing circuit for the third sequence relay closed by said second sequence relay in its energized condition, a second energizing circuit for said third sequence relay closed by said third input relay in its energized condition, stick circuit means for each sequence relay comprising a contact closed by the corresponding input relay in its energized condition, and an energizing circuit for each connector relay closed by its corresponding input and sequence relays in their energized condition, any next higher ordered sequence relay in its energized condition, and any lower ordered sequence relays in their deenergized conditions.

10. A random access circuit, comprising, in combination, a plurality of input terminals, a demand register for each terminal adapted to be energized to indicate a request for interrogating the terminal, a sequence register for each demand register and having energized and deenergized conditions, the plurality of sequence registers having a preselected ordered sequence, means controlled by each demand register in its energized condition and the sequence registers ordered in a first sense from the sequence register corresponding to that demand register in their deenergized conditions for energizing said corresponding sequence register, output connector means, and means controlled by each sequence register in its energized condition and the remaining sequence registers ordered opposite to said first sense from that sequence register in their deenergized conditions for actuating in predetermined sequence said output connector means to interrogate said input terminals.

11. In combination, three stations each having a first terminal energized with a signal representing a parameter and a second terminal energized when said parameter changes, a processing system having an input terminal connected to means for producing an output in accordance with a signal applied to said input terminal, a slow release relay, means for energizing said slow release relay in response to operation of said processing system, first, second and third input relays each connected to a corresponding one of said second terminals, first, second and third sequence relays corresponding to said input relays, first, second and third connector relays corresponding to said input relays, circuit means controlled by said slow release relay, said sequence relays and said input relays for energizing each of said connector relays when the corresponding sequence relay is energized and the remaining sequence relays are deenergized, and said slow release relay is deenergized, and means controlled by each connector relay for connecting a corresponding first terminal to said input terminal.

12. In combination, first, second and third input sources each having a first terminal energized with a signal representing the value of a parameter and a second terminal energized when the value of the parameter changes, first, second and third input relays having energizing circuits including the second terminal of said first, second and third sources, respectively, first, second and third sequence relays, an energizing circuit for said first sequence relay including a contact closed by said first input relay in its energized condition and contacts closed by said second and third sequence relays in their deenergized conditions, a first energizing circuit for said second sequence relay including a contact closed by said second input relay in its energized condition and a contact closed by said third sequence relay in its deenergized condition, a second energizing circuit for said second sequence relay including a contact closed by said first sequence relay in its energized condition, a first energizing circuit for said third sequence relay including a contact closed by said third input relay in its energized condition, a second energizing circuit for said third sequence relay including a contact closed by said second sequence relay in its energized condition, first, second and third connecting relays, a slow release relay; an energizing circuit for said first connecting relay closed by said first input relay in its energized condition, said first and second sequence relays in their energized conditions, and said slow release relay in its deenergized condition; an energizing circuit for said second connecting relay closed by said second input relay, said second sequence relay and said third sequence relay in their energized conditions and said first sequence relay and said slow release relays in their deenergized conditions; an energizing circuit for said third connecting relay closed by said third input relay and said third sequence relay in their energized conditions and said second sequence relay and said slow release relay in their deenergized conditions, an output circuit, means for connecting each of said first source terminals to said output circuit when its corresponding connecting relay is energized, means controlled by said output circuit for energizing and then deenergizing said slow release relay, means controlled by each connecting relay in its energized condition and said slow release relay in its energized condition for maintaining the connecting relay energized, means controlled by each connecting relay in its deenergized condition and the corresponding input relay in its energized condition for maintaining the input relay energized, and means controlled by each sequence relay and the corresponding input relay in their energized conditions for maintaining the sequence relay energized.

References Cited in the file of this patent

UNITED STATES PATENTS

| | | |
|---|---|---|
| 1,772,167 | Taylor | Aug. 5, 1930 |
| 1,982,290 | Gardiner | Nov. 27, 1934 |
| 2,444,202 | McAlpine et al. | June 29, 1948 |
| 2,485,343 | Zuschlag | Oct. 18, 1949 |
| 2,597,075 | Derr | May 20, 1952 |
| 2,644,931 | Derr et al. | July 7, 1953 |
| 2,719,284 | Roberts et al. | Sept. 27, 1955 |
| 2,836,734 | Cichanowicz | May 27, 1958 |
| 2,840,705 | Scully | June 24, 1958 |
| 2,958,857 | Johnson et al. | Nov. 1, 1960 |
| 3,020,524 | Quinn | Feb. 6, 1962 |